US012192734B2

(12) United States Patent
Schuijers

(10) Patent No.: US 12,192,734 B2
(45) Date of Patent: Jan. 7, 2025

(54) PARAMETRIC STEREO UPMIX APPARATUS, A PARAMETRIC STEREO DECODER, A PARAMETRIC STEREO DOWNMIX APPARATUS, A PARAMETRIC STEREO ENCODER

(71) Applicant: KONINKLIJKE PHILIPS N.V., Eindhoven (NL)

(72) Inventor: Erik G. P. Schuijers, Breda (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/525,910

(22) Filed: Dec. 1, 2023

(65) Prior Publication Data

US 2024/0121567 A1 Apr. 11, 2024

Related U.S. Application Data

(60) Continuation of application No. 17/324,420, filed on May 19, 2021, now Pat. No. 11,871,205, which is a (Continued)

(30) Foreign Application Priority Data

May 23, 2008 (EP) .................................... 08156801

(51) Int. Cl.
*H04S 5/00* (2006.01)
*G10L 19/008* (2013.01)
*H04S 3/02* (2006.01)

(52) U.S. Cl.
CPC .............. *H04S 5/00* (2013.01); *G10L 19/008* (2013.01); *H04S 3/02* (2013.01); *H04S 2400/03* (2013.01); *H04S 2420/03* (2013.01)

(58) Field of Classification Search
CPC ............... G10L 19/008; H04S 2400/03; H04S 2420/03; H04S 3/02; H04S 5/00
(Continued)

(56) References Cited

U.S. PATENT DOCUMENTS 5,434,948 A * 7/1995 Holt ....................... H04H 20/88 704/201
5,717,764 A 2/1998 Johnston et al.
(Continued)

FOREIGN PATENT DOCUMENTS

JP H04506141 A 10/1992
JP 20089026914 A 2/2008
(Continued)

OTHER PUBLICATIONS

Ekstrand, P.: "Bandwidth Extension of Audio Signals by Spectral Band Replication"; Proceedings of the 1SR IEEE Benelux Workshop on Model Based Processing and Coding of Audio (MPCA-2002), Leuven, Belgium, Nov. 2002, pp. 53-58.
(Continued)

*Primary Examiner* — Lun-See Lao

(57) ABSTRACT

A parametric stereo upmix method for generating a left signal and a right signal from a mono downmix signal based on spatial parameters includes predicting a difference signal comprising a difference between the left signal and the right signal based on the mono downmix signal scaled with a prediction coefficient. The prediction coefficient is derived from the spatial parameters. The method further includes deriving the left signal and the right signal based on a sum and a difference of the mono downmix signal and said difference signal.

23 Claims, 9 Drawing Sheets

Related U.S. Application Data continuation of application No. 16/166,496, filed on Oct. 22, 2018, now Pat. No. 11,019,445, which is a division of application No. 15/411,127, filed on Jan. 20, 2017, now Pat. No. 10,136,237, which is a division of application No. 14/330,498, filed on Jul. 14, 2014, now Pat. No. 9,591,425, which is a division of application No. 12/992,317, filed as application No. PCT/IB2009/005009 on May 14, 2009, now Pat. No. 8,811,621.

(58) Field of Classification Search
USPC .......................................... 381/17–23; 700/94
See application file for complete search history.

(56) References Cited

U.S. PATENT DOCUMENTS

| | | | | |
|---|---|---|---|---|
| 7,391,870 | B2 * | 6/2008 | Herre | G10L 19/008 381/23 |
| 7,573,912 | B2 * | 8/2009 | Lindblom | G10L 19/008 381/23 |
| 7,933,415 | B2 | 4/2011 | Breebaart | |
| 8,811,621 | B2 | 8/2014 | Schuijers | |
| 9,591,425 | B2 | 3/2017 | Schuijers | |
| 10,136,237 | B2 | 11/2018 | Schuijers | |
| 11,871,205 | B2 * | 1/2024 | Schuijers | H04S 5/00 |
| 2006/0133618 | A1 | 6/2006 | Mllemoes | |
| 2007/0280485 | A1 * | 12/2007 | Villemoes | H04S 7/307 381/119 |
| 2008/0031462 | A1 * | 2/2008 | Walsh | H04S 1/002 381/17 |
| 2008/0199014 | A1 | 8/2008 | Kurniawati et al. | |
| 2010/0094631 | A1 * | 4/2010 | Engdegard | G10L 19/008 704/258 |
| 2011/0022402 | A1 | 10/2011 | Engderard | |

FOREIGN PATENT DOCUMENTS

| | | | |
|---|---|---|---|
| KR | 20070107615 | A | 11/2007 |
| TW | 1303411 | B | 11/2008 |
| TW | 1427621 | B | 2/2014 |
| WO | 09016136 | A1 | 12/1990 |
| WO | 2003090206 | A1 | 10/2003 |
| WO | 2006048815 | A1 | 5/2006 |
| WO | 2006060279 | A1 | 6/2006 |
| WO | 2006108573 | A1 | 10/2006 |
| WO | 2007010451 | A1 | 1/2007 |

OTHER PUBLICATIONS

Breebaart et al: "Parametric Coding of Stereo Audio"; EURASIP Journal on Applied Signal Processing, 2005, vol. 9, pp. 1305-1322.

Breebaart et al: "MPEG Spatial Audio Coding/MPEG Surround: Overview and Current Status"; Audio Engineering Soscity Convention Paper, 119th Convention, Oct. 2005, pp. 1-17.

Kontola et al: "AMR-WB+:Low Bit Rate Audio Coding for Mobile Multimedia"; IEEE Symposium on Broadband Multimedia Systems and Broadcasting, 2006, pp. 1-6.

* cited by examiner

PARAMETRIC STEREO UPMIX APPARATUS, A PARAMETRIC STEREO DECODER, A PARAMETRIC STEREO DOWNMIX APPARATUS, A PARAMETRIC STEREO ENCODER

This application is a continuation of prior U.S. patent application Ser. No. 17/324,420, which is a continuation Ser. No. 16/166,496 filed on Oct. 22, 2018, now U.S. Pat. No. 11,019,445, issued May 25, 2021, which is a divisional Ser. No. 15/411,127 filed on Jan. 20, 2017, now U.S. Pat. No. 10,136,237, issued Nov. 20, 2018, which is a divisional Ser. No. 14/330,498, filed Jul. 14, 2014, now U.S. Pat. No. 9,591,425, issued Mar. 7, 2017, which is a divisional of prior U.S. patent application Ser. No. 12/992,317, filed Nov. 12, 2010, now U.S. Pat. No. 8,811,621, issued Aug. 19, 2014, which is a national application of PCT Application No. PCT/IB2009/052009, filed May 14, 2009 and claims the benefit of European Patent Application No. 08156801.6, filed May 23, 2008, the entire contents of each of which are incorporated herein by reference thereto.

The invention relates to a parametric stereo upmix apparatus for generating a left signal and a right signal from a mono downmix signal based on spatial parameters. The invention further relates to a parametric stereo decoder comprising parametric stereo upmix apparatus, a method for generating a left signal and a right signal from a mono downmix signal based on spatial parameters, an audio playing device, a parametric stereo downmix apparatus, a parametric stereo encoder, a method for generating a prediction residual signal for a difference signal, and a computer program product.

Parametric Stereo (PS) is one of the major advances in audio coding of the last couple of years. The basics of Parametric Stereo are explained in J. Breebaart, S. van de Par, A. Kohlrausch and E. Schuijers, "Parametric Coding of Stereo Audio", in *EURASIP J. Appl. Signal Process., vol* 9, pp. 1305-1322 (2004). Compared to traditional, a so-called discrete coding of audio signals, the PS encoder as depicted in FIG. 1 transforms a stereo signal pair (l, r) 101, 102 into a single mono downmix signal 104 plus a small amount of parameters 103 describing the spatial image. These parameters comprise Interchannel Intensity Differences (iids), Interchannel Phase (or Time) Differences (ipds/itds) and Interchannel Coherence/Correlation (iccs). In the PS encoder 100 the spatial image of the stereo input signal (l, r) is analyzed resulting in iid, ipd and icc parameters. Preferably, the parameters are time and frequency dependent. For each time/frequency tile the iid, ipd and icc parameters are determined. These parameters are quantized and encoded 140 resulting in the PS bit-stream. Furthermore, the parameters are typically also used to control how the downmix of the stereo input signal is generated. The resulting mono sum signal(s) 104 is subsequently encoded using a legacy mono audio encoder 120. Finally the resulting mono and PS bit-stream are merged to construct the overall stereo bit-stream 107.

In the PS decoder 200 the stereo bit-stream is split into a mono bit-stream 202 and PS bit-stream 203. The mono audio signal is decoded resulting in a reconstruction of the mono downmix signal 204. The mono downmix signal is fed to the PS upmix 230 together with the decoded spatial image parameters 205. The PS upmix then generates the output stereo signal pair (l, r) 206, 207. In order to synthesize the icc cues, the PS upmix employs a so-called decorrelated signal ($s_d$), i.e., a signal is generated from the mono audio signal that has roughly the same spectral and temporal envelope, that however has a correlation of substantially zero with regard to the mono input signal. Then, based on the spatial image parameters, within the PS upmix for each time/frequency tile a 2×2 matrix is determined and applied:

$$\begin{bmatrix} l \\ r \end{bmatrix} = \begin{bmatrix} H_{11} & H_{12} \\ H_{21} & H_{22} \end{bmatrix} \begin{bmatrix} s \\ s_d \end{bmatrix},$$

where $H_{ij}$ represents an (i, j) upmix matrix H entry. The H matrix entries are functions of the PS parameters iid, icc and optionally ipd/opd. In the state-of-the-art PS system in case ipd/opd parameters are employed, the upmix matrix H can be decomposed as:

$$\begin{bmatrix} l \\ r \end{bmatrix} = \begin{bmatrix} e^{j\varphi_1} & 0 \\ 0 & e^{j\varphi_2} \end{bmatrix} \begin{bmatrix} h_{11} & h_{12} \\ h_{21} & h_{22} \end{bmatrix} \begin{bmatrix} s \\ s_d \end{bmatrix},$$

where the left 2×2 matrix represents the phase rotations, a function of the ipd and opd parameters, and the right 2×2 matrix represents the part that reinstates the iid and icc parameters.

In WO2003090206 A1 it is proposed to equally distribute the ipd over the left and right channels in the decoder. Furthermore, it is proposed to generate a downmix signal by rotating the left and right signals both towards each other by half the measured ipd to obtain alignment. In practice, in case of nearly out of phase signals, this results for, both, the downmix generated in the encoder as well as the upmix generated in the decoder that the ipd over time varies slightly around 180 degrees, which due to wrapping may consist of a sequence of angles such as 179, 178, −179, 177, −179, . . . . As result of these jumps subsequent time/frequency tiles in the downmix exhibits phase discontinuities or in other words phase instability. Due to the inherent overlap-add synthesis structure this results in audible artefacts.

As an example, consider the downmix where in the one time/frequency tile the downmix is generated as:

$$s=le^{j(\pi/2-\varepsilon)}+re^{j(-\pi/2+\varepsilon)},$$

where ε is some arbitrary small angle, meaning that the ipd measured was close to 180 degrees, whereas for the next time-frequency tile the downmix is generated as:

$$s=le^{j(-\pi/2+\varepsilon)}+re^{j(\pi/2-\varepsilon)},$$

meaning that the measured ipd was close to −180 degrees. Using typical overlap-add synthesis a phase cancellation will occur in between the midpoints of the subsequent time/frequency tiles yielding artefacts.

A major disadvantage of the parametric stereo coding as discussed above is instability of a synthesis of the Interaural Phase Difference (ipd) cues in the PS decoder which are used in generating the output stereo pair. This instability has its source in phase modifications performed in the PS encoder in order to generate the downmix, and in the PS decoder in order to generate the output signal. As a result of this instability a lower audio quality of the output stereo pair is experienced.

In order to deal with this phase instability problem in practice the ipd synthesis is often discarded. However, this results in a reduced (spatial) audio quality of the reconstructed stereo signal.

Another alternative of dealing with this instability problem when ipd parameters are used is to incorporate so-called Overall Phase Differences (opds) in the bitstream in order to provide the decoder with a phase reference. In this way the continuity over time/frequency tiles can be increased by allowing for a common phase rotation. This however happens at the expense of an increase of bitrate, and thus results in deterioration of the overall system performance.

It is an object of the invention to provide an enhanced parametric stereo upmix apparatus for generating a left signal and a right signal from a mono downmix signal that has improved audio quality of the generated left and right signals without additional bitrate increase, and does not suffer from the instabilities inferred by the interaural phase differences (ipds) synthesis.

This object is achieved by a parametric stereo (PS) upmix apparatus comprising a means for predicting a difference signal comprising a difference between the left signal and the right signal based on the mono downmix signal scaled with a prediction coefficient. Said prediction coefficient is derived from the spatial parameters. Said PS upmix apparatus further comprises an arithmetic means for deriving the left signal and the right signal based on a sum and a difference of the mono downmix signal and said difference signal.

The proposed PS upmix apparatus offers a different way of derivation of the left signal and the right signal to this of the known PS decoder. Instead of applying the spatial parameters to reinstate the correct spatial image in a statistical sense as done in the known PS decoder, the proposed PS upmix apparatus constructs the difference signal from the mono downmix signal and the spatial parameters. Both the known and the proposed PS aim at reinstating the correct power ratios (iids), cross correlations (iccs) and phase relations (ipds). However, the known PS decoder does not strive to obtain the most accurate waveform match. Instead it ensures that the measured encoder parameters statistically match to the reinstated decoder parameters. In the proposed PS upmix by simple arithmetic operations, such as a sum and a difference, applied to the mono downmix signal and the estimated difference signal the left signal and the right signal are obtained. Such construction gives much better results for the quality and stability of the reconstructed left and right signals since it provides a close waveform match reinstating the original phase behavior of the signal.

In an embodiment, said prediction coefficient is based on waveform matching the downmix signal onto the difference signal. Waveform matching as such does not suffer from instabilities as the statistical approach used in known PS decoder for ipd and opd synthesis does since it inherently provides phase preservation. Thus by using the difference signal derived as a (complex-valued) scaled mono downmix signal and deriving the prediction coefficient based on waveform matching the source of instabilities of the known PS decoder is removed. Said waveform matching comprises e.g. a least-squares match of the mono downmix signal onto the difference signal, calculating the difference signal as:

$$d=\alpha\cdot s,$$

where s is the downmix signal and α is the prediction coefficient. It is well known that the least-squares prediction solution is given by:

$$\alpha=\frac{\langle s, d\rangle^*}{\langle s, s\rangle},$$

where ⟨s, d⟩ * represents the complex conjugate of the cross correlation of the downmix and the difference signal and ⟨s, s⟩ represents the power of the downmix signal.

In a further embodiment, the prediction coefficient is given as a function of the spatial parameters:

$$\alpha=\frac{iid-1-j\cdot 2\cdot\sin(ipd)\cdot icc\cdot\sqrt{iid}}{iid+1+2\cdot\cos(ipd)\cdot icc\cdot\sqrt{iid}}$$

whereby iid, ipd, and icc are the spatial parameters, and iid is an interchannel intensity difference, ipd is an interchannel phase difference, and icc is an interchannel coherence. It is generally difficult to quantize the complex-valued prediction coefficient α in a perceptually meaningful sense since the required accuracy depends on the properties of the left and right audio signals to be reconstructed. Hence, the advantage of this embodiment is that in contrast to the complex prediction coefficient α, the required quantization accuracies for the spatial parameters are well known from psycho-acoustics. As such, optimal use of the psycho-acoustic knowledge can be employed to efficiently, i.e. with the least steps possible, quantize the prediction coefficient to lower the bit rate. Furthermore, this embodiment allows for upmixing using backward compatible PS content.

In a further embodiment, the means for predicting the difference signal are arranged to enhance the difference signal by adding a scaled decorrelated mono downmix signal. Since in general it is not possible to completely predict the original encoder difference signal from the mono downmix signal, it gives a rise to a residual signal. This residual signal has no correlation with the downmix signal as otherwise it would have been taken into account by means of the prediction coefficient. In many cases the residual signal comprises a reverberant sound field of a recording. The residual signal can be effectively synthesized using a decorrelated mono downmix signal, derived from the mono downmix signal.

In a further embodiment, said decorrelated mono downmix is obtained by means of filtering the mono downmix signal. The goal of this filtering is to effectively generate a signal with a similar spectral and temporal envelope as the mono downmix signal, but with a correlation substantially close to zero such that it corresponds to a synthetic variant of the residual component derived in the encoder. This can e.g. be achieved by means of allpass filtering, delays, lattice reverberation filters, feedback delay networks or a combination thereof. Additionally, power normalization can be applied to the decorrelated signal in order to ensure that the power for each time/frequency tile of the decorrelated signal closely corresponds to that of the mono downmix signal. In this way it is ensured that the decoder output signal will contain the correct amount of decorrelated signal power.

In a further embodiment, a scaling factor applied to the decorrelated mono downmix is set to compensate for a prediction energy loss. The scaling factor applied to the decorrelated mono downmix ensures that the overall signal power of the left signal and right signal at the decoder side matches the signal power of the left and right signal power at the encoder side, respectively. As such the scaling factor β can also be interpreted as a prediction energy loss compensation factor.

In a further embodiment, the scaling factor applied to the decorrelated mono downmix is given as a function of the spatial parameters:

$$\beta = \sqrt{\frac{iid + 1 - 2 \cdot \cos(ipd) \cdot icc \cdot \sqrt{iid}}{iid + 1 + 2 \cdot \cos(ipd) \cdot icc \cdot \sqrt{iid}} - |\alpha|^2}$$

whereby iid, ipd, and icc are the spatial parameters, and iid is an interchannel intensity difference, ipd is an interchannel phase difference, icc is an interchannel coherence, and $\alpha$ is the prediction coefficient. Similarly as in case of the prediction coefficient, expressing the decorrelated scaling factor $\beta$ as a function of the spatial parameters enables the use of the knowledge about the required quantization accuracies of these spatial parameters. As such, optimal use of the psychoacoustic knowledge can be employed to lower the bit rate.

In a further embodiment, said parametric stereo upmix has a prediction residual signal for the difference signal as an additional input, whereby the arithmetic means are arranged for deriving the left signal and the right signal also based on said prediction residual signal for the difference signal. To avoid long names of signals a prediction residual signal is used for the prediction residual signal for the difference signal throughout the remainder of the patent application. The prediction residual signal operates as a replacement for the synthetic decorrelation signal by its original encoder counterpart. It allows reinstating the original stereo signal in the decoder. This however is at the cost of additional bitrate since the prediction signal needs to be encoded and transmitted to the decoder. Therefore, typically the bandwidth of the prediction residual signal is limited. The prediction residual signal can either completely replace the decorrelated mono downmix signal for a given time/frequency tile or it can work in a complementary fashion. The latter can be beneficial in case the prediction residual signal is only sparsely coded, e.g. only a few of the most significant frequency bins are encoded. In that case, compared to the encoder situation, still energy will be missing. This lack of energy will be filled by the decorrelated signal. A new decorrelated scaling factor $\beta'$ is then calculated as:

$$\beta' = \sqrt{\beta^2 - \frac{\langle d_{res,cod}, d_{res,cod}\rangle}{\langle s, s\rangle}},$$

where $\langle d_{res,cod}, d_{res,cod}\rangle$ is the signal power of the coded prediction residual signal and $\langle s, s\rangle$ is the power of the mono downmix signal. These signal powers can be measured at the decoder side and thus need not need to be transmitted as signal parameters.

The invention further provides a parametric stereo decoder comprising said parametric stereo upmix apparatus and an audio playing device comprising said parametric stereo decoder.

The invention also provides a parametric stereo downmix apparatus and a parametric stereo encoder comprising said parametric stereo downmix apparatus.

The invention further provides method claims as well as a computer program product enabling a programmable device to perform the method according to the invention.

These and other aspects of the invention will be apparent from and elucidated with reference to the embodiments shown in the drawings, in which:

FIG. 1 schematically shows an architecture of a parametric stereo encoder (prior art);

FIG. 2 schematically shows an architecture of a parametric stereo decoder (prior art);

Throughout the figures, same reference numerals indicate similar or corresponding features. Some of the features indicated in the drawings are typically implemented in software, and as such represent software entities, such as software modules or objects.

Figure 3:
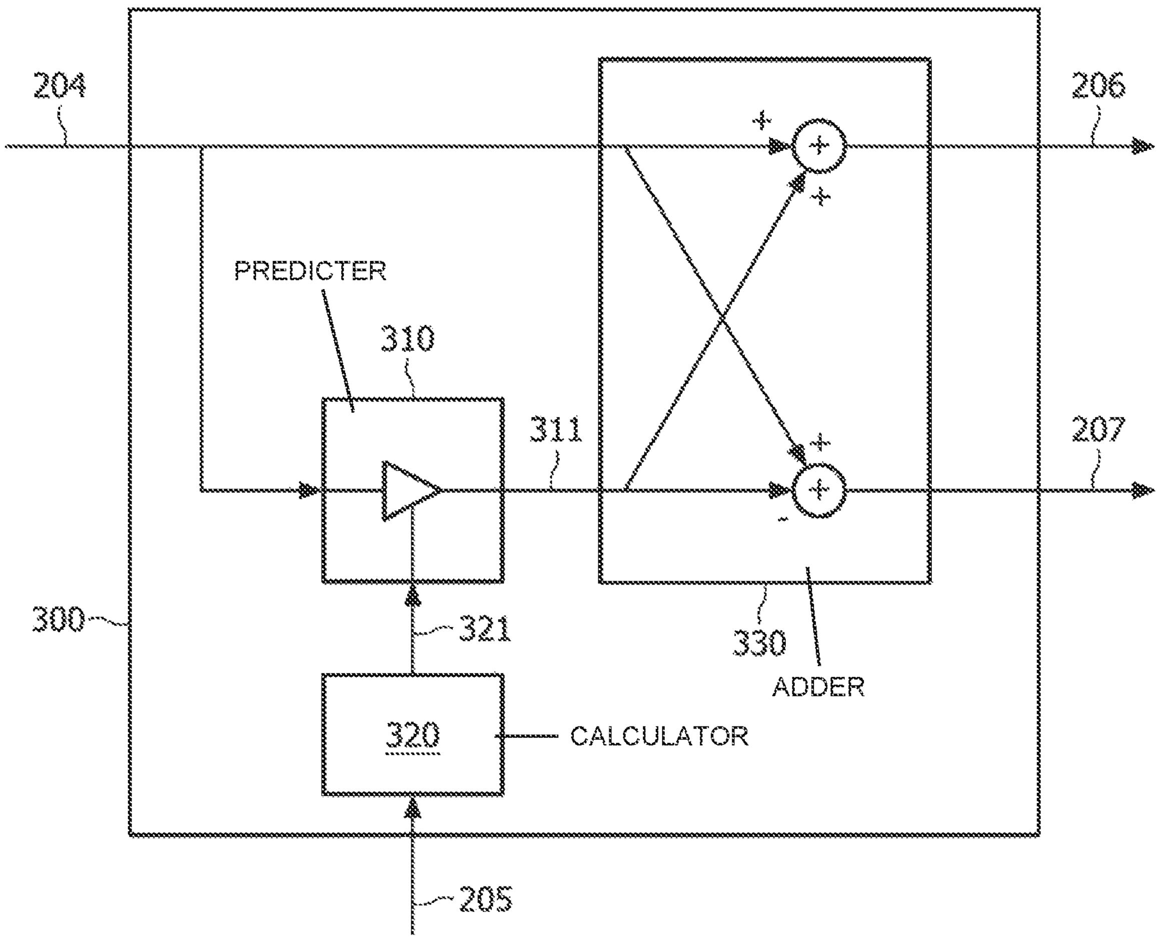
FIG. 3 shows a parametric stereo upmix apparatus according to the invention, said parametric stereo upmix apparatus generating a left signal and a right signal from a mono downmix signal based on spatial parameters.

FIG. 3 shows a parametric stereo upmix apparatus 300 according to the invention. Said parametric stereo upmix apparatus 300 generates a left signal 206 and right signal 207 from a mono downmix signal 204 based on spatial parameters 205.

Said parametric stereo upmix apparatus 300 comprises a means 310 for predicting a difference signal 311 comprising a difference between the left signal 206 and the right signal 207 based on the mono downmix signal 204 scaled with a prediction coefficient 321, whereby said prediction coefficient 321 is derived from the spatial parameters 205 in a unit 320 and an arithmetic means 330 for deriving the left signal 206 and the right signal 207 based on a sum and a difference of the mono downmix signal 204 and said difference signal 311.

The left signal 206 and right signal 207 are preferably reconstructed as follows:

$$l = s + d,$$

$$r = s - d,$$

where s is the mono downmix signal, and d is the difference signal. This is under the assumption that the encoder sum signal is calculated as:

$$s = \frac{l + r}{2}.$$

In practice gain normalization is often applied when constructing the left signal 206 and the right signal 207:

$$l = \frac{1}{2c} \cdot (s + d),$$

$$r = \frac{1}{2c} \cdot (s - d),$$

where c is a gain normalization constant and is a function of the spatial parameters. Gain normalization ensures that a power of the mono downmix signal 204 is equal to a sum of powers of the left signal 206 and the right signal 207. In this case the encoder sum signal was calculated as:

$$s = c \cdot (l + r).$$

The spatial parameters are determined in an encoder beforehand and transmitted to the decoder comprising a parametric stereo upmix 300. Said spatial parameters are determined on a frame-by-frame basis for each time/frequency tile as:

$$iid = \frac{\langle l, l \rangle}{\langle r, r \rangle},$$

$$icc = \frac{|\langle l, r \rangle|}{\sqrt{\langle l, l \rangle \cdot \langle r, r \rangle}},$$

$$ipd = \angle \langle l, r \rangle,$$

where iid is an interchannel intensity difference, icc is an interchannel coherence, ipd is an interchannel phase difference, and $\langle l, l \rangle$ and $\langle r, r \rangle$ are the left and right signal powers respectively and $\langle l, r \rangle$ represents the non-normalized complex-valued covariance coefficient between the left and right signals.

For a typical complex-valued frequency domain such as the DFT (FFT), these powers are measured as:

$$\langle l, l \rangle = \sum_{k \in k_{tile}} l[k] \cdot l^*[k],$$

$$\langle r, r \rangle = \sum_{k \in k_{tile}} r[k] \cdot r^*[k],$$

$$\langle l, r \rangle = \sum_{k \in k_{tile}} l[k] \cdot r^*[k],$$

where $k_{tile}$ represents the DFT bins corresponding to a parameter band. It is to be noted that also other complex domain representation could be used, such as e.g. a complex exponentially modulated QMF bank as described in P. Ekstrand, "Bandwidth extension of audio signals by spectral band replication", in *Proc. 1st IEEE Benelux Workshop on Model based Processing and Coding of Audio* (*MPCA*-2002), Leuven, Belgium, November 2002, pp. 73-79.

For low frequencies up to 1.5-2 kHz the above equations hold. However, for higher frequencies the ipd parameters are not relevant for perception and therefore they are set to a zero value resulting in:

$$iid = \frac{\langle l, l \rangle}{\langle r, r \rangle},$$

-continued $$icc = \frac{\Re\{\langle l, r \rangle\}}{\sqrt{\langle l, l \rangle \cdot \langle r, r \rangle}},$$

$$ipd = 0.$$

Alternatively, since at higher frequencies, rather the broadband envelope than the phase differences are important for perception, the icc is calculated as:

$$icc = \frac{|\langle l, r \rangle|}{\sqrt{\langle l, l \rangle \cdot \langle r, r \rangle}}.$$

The gain normalization constant c is expressed as:

$$c = \sqrt{\frac{iid + 1}{iid + 1 + 2 \cdot icc \cdot \cos(ipd) \cdot \sqrt{iid}}}.$$

Since c may approach infinity due to left and right signals being out of phase, the value of the gain normalization constant c is typically limited as:

$$c = \min\left(\sqrt{\frac{iid + 1}{iid + 1 + 2 \cdot icc \cdot \cos(ipd) \cdot \sqrt{iid}}}, c_{max}\right),$$

with $c_{max}$ being the maximum amplification factor, e.g. $c_{max}=2$.

In an embodiment, said prediction coefficient is based on estimating the difference signal 311 from the mono downmix signal 204 using waveform matching. Said waveform matching comprises e.g. a least-squares match of the mono downmix signal 204 onto the difference signal 311, resulting in the difference signal provided as:

$$d = \alpha \cdot s,$$

where s is the mono downmix signal 204 and α is the prediction coefficient 321.

Beside the least-squares matching a waveform matching using a different norm from $L_2$-norm can be used. Alternatively, the p-norm error $\|d-\alpha \cdot s\|^p$ could be e.g. perceptually weighted. However, the least-squares matching is advantageous as it results in relatively simple calculations for deriving the prediction coefficient from the transmitted spatial image parameters.

It is well known that the least-squares prediction solution for the prediction coefficient α is given by:

$$\alpha = \frac{\langle s, d \rangle^*}{\langle s, s \rangle},$$

where $\langle s, d \rangle^*$ represents the complex conjugate of the cross correlation of the mono downmix signal 204 and the difference signal 311 and $\langle s, s \rangle$ represents the power of the mono downmix signal.

In a further embodiment, the prediction coefficient 321 is given as a function of the spatial parameters:

$$\alpha = \frac{iid - 1 - j \cdot 2 \cdot \sin(ipd) \cdot icc \cdot \sqrt{iid}}{iid + 1 + 2 \cdot \cos(ipd) \cdot icc \cdot \sqrt{iid}}.$$

Said prediction coefficient is calculated in unit 320 according to the above formula.

Figure 4:
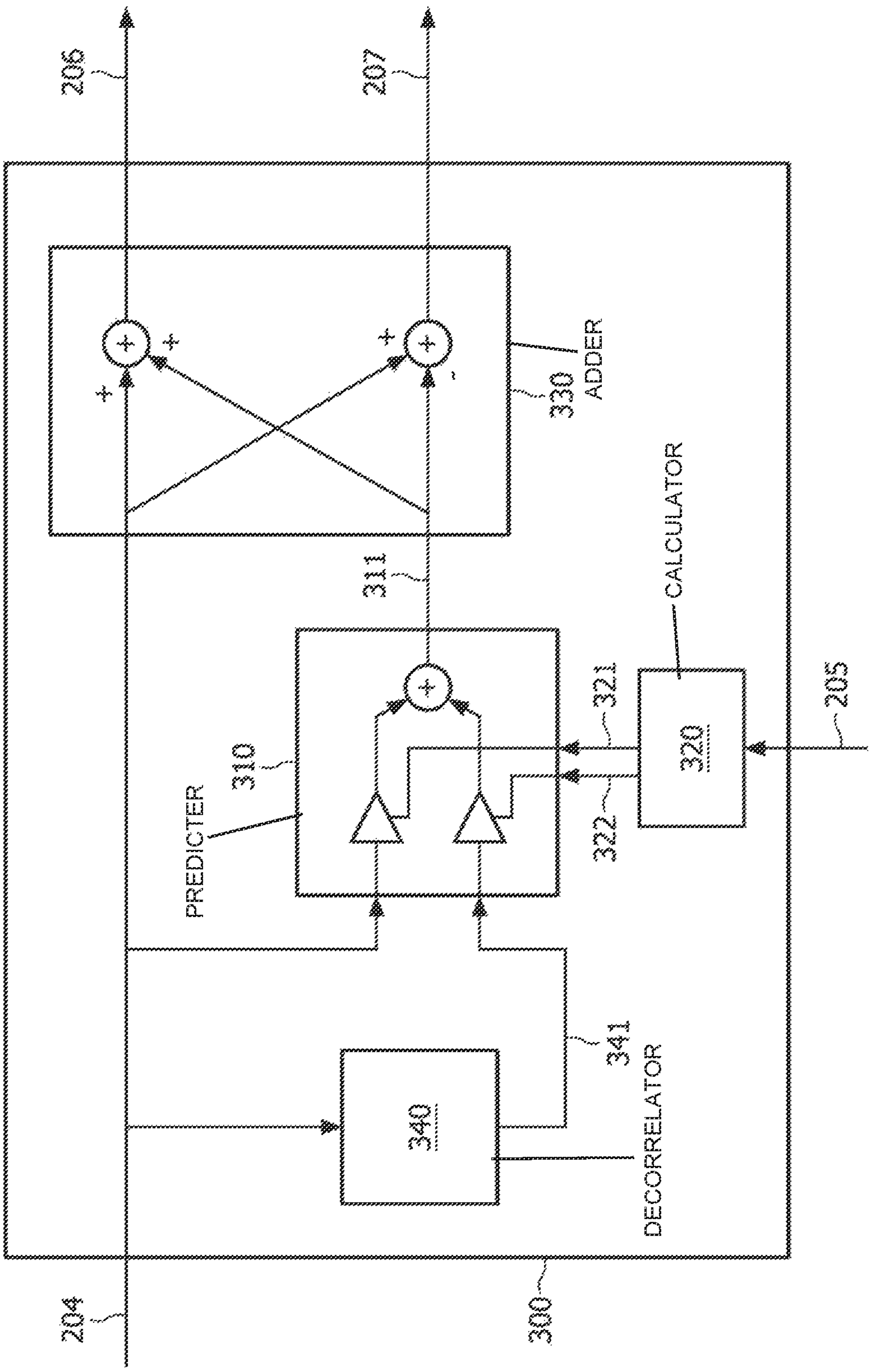
FIG. 4 shows the parametric stereo upmix apparatus comprising a prediction means being arranged to enhance the difference signal by adding a scaled decorrelated mono downmix signal.

FIG. 4 shows the parametric stereo upmix apparatus 300 comprising a prediction means 310 being arranged to enhance the difference signal by adding a scaled decorrelated mono downmix signal. The mono downmix signal 204 is provided to the unit 340 for decorrelating. As a result the decorrelated mono downmix signal 341 is provided at the output of the unit 340. In the prediction means 310 a first part of the difference signal is calculated by scaling the mono downmix signal 204 with the prediction coefficient 321. Additionally the decorrelated mono downmix signal 341 is also scaled in the prediction means 310 with the scale factor 322. A resulting second part of the difference signal is consequently added to the first part of the difference signal resulting in the enhanced difference signal 311. The mono downmix signal 204 and the enhanced difference signal 311 are provided to the arithmetic means 330, which calculate the left signal 206 and the right signal 207.

In general it is not possible to accurately predict the difference signal from the mono downmix signal by just scaling with the prediction coefficient. This gives rise to a residual signal $d_{res}=d-\alpha\cdot s$. This residual signal has no correlation with the downmix signal as otherwise it would have been taken into account by means of the prediction coefficient. In many cases the residual signal comprises a reverberant sound field of a recording. The residual signal is effectively synthesized using a decorrelated mono downmix signal, derived from the mono downmix signal. Said decorrelated signal is the second part of the difference signal that is calculated in the prediction means 310.

In a further embodiment, said decorrelated mono downmix 341 is obtained by means of filtering the mono downmix signal 204. Said filtering is performed in the unit 340. This filtering generates a signal with a similar spectral and temporal envelope as the mono downmix signal 204, but with a correlation substantially close to zero such that it corresponds to a synthetic variant of the residual component derived in the encoder. This effect is achieved by means of e.g. allpass filtering, delays, lattice reverberation filters, feedback delay networks or a combination thereof.

In a further embodiment, a scaling factor 322 applied to the decorrelated mono downmix 341 is set to compensate for a prediction energy loss. The scaling factor 322 applied to the decorrelated mono downmix 341 ensures that the overall signal power of the left signal 206 and right signal 207 at the output of the parametric stereo upmix apparatus 300 matches the signal power of the left and right signal power at the encoder side, respectively. As such the scaling factor 322 indicated further as β is interpreted as a prediction energy loss compensation factor. The difference signal d is then expressed as:

$$d=\alpha\cdot s+\beta\cdot s_d,$$

where $s_d$ is the decorrelated mono downmix signal.

It can be shown that said scaling factor 322 can be expressed as:

$$\beta = \sqrt{\frac{\langle d, d\rangle}{\langle s, s\rangle} - |\alpha|^2}$$

in terms of signal powers corresponding to the difference signal d and the mono downmix signal s.

In a further embodiment, the scaling factor 322 applied to the decorrelated mono downmix 341 is given as a function of the spatial parameters 205:

$$\beta = \sqrt{\frac{iid + 1 - 2 \cdot \cos(ipd) \cdot icc \cdot \sqrt{iid}}{iid + 1 + 2 \cdot \cos(ipd) \cdot icc \cdot \sqrt{iid}} - |\alpha|^2}.$$

Said scaling factor 322 is derived in unit 320.

In case, no downmix normalization was applied in the encoder, i.e., the downmix signal was calculated as $s=\frac{1}{2}(l+r)$, the left signal 206 and the right signal 207 are then expressed as:

$$\begin{bmatrix} l \\ r \end{bmatrix} = \begin{bmatrix} 1+\alpha & \beta \\ 1-\alpha & -\beta \end{bmatrix} \begin{bmatrix} s \\ s_d \end{bmatrix}.$$

In case downmix normalization was applied, i.e., the downmix signal was calculated as $s=c(l+r)$, the left signal 206 and the right signal 207 are expressed as:

$$\begin{bmatrix} l \\ r \end{bmatrix} = \begin{bmatrix} 1/2c & 0 \\ 0 & 1/2c \end{bmatrix} \begin{bmatrix} 1+\alpha & \beta \\ 1-\alpha & -\beta \end{bmatrix} \begin{bmatrix} s \\ s_d \end{bmatrix}.$$

Figure 5:
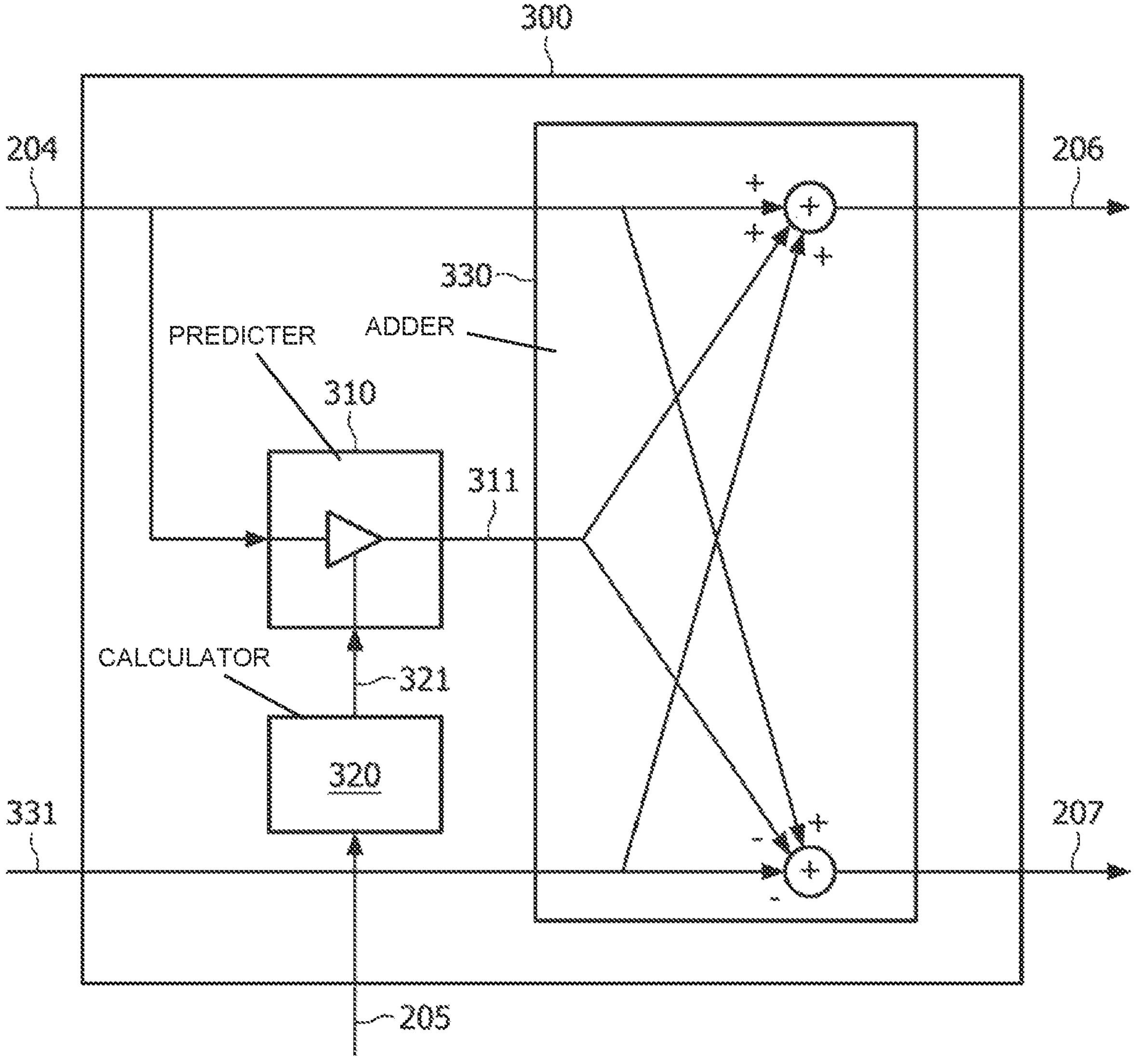
FIG. 5 shows the parametric stereo upmix apparatus having a prediction residual signal for the difference signal as an additional input.

FIG. 5 shows the parametric stereo upmix apparatus 300 having a prediction residual signal for the difference signal 331 as an additional input. The arithmetic means 330 are arranged for deriving the left signal 206 and the right signal 207 based on the mono downmix signal 204, the difference signal 311, and said prediction residual signal 331. The means 310 predict a difference signal 311 based on the mono downmix signal 204 scaled with a prediction coefficient 321. Said prediction coefficient 321 is derived in the unit 320 based on the spatial parameters 205.

The left signal 206 and the right signal 207, respectively, are given as:

$$l=s+d+d_{res},$$

$$r=s-d-d_{res},$$

where $d_{res}$ is the prediction residual signal.

Alternatively, in case power normalization was applied to the downmix, but not to the residual signal the left signal and the right signal can be derived as:

$$l = \frac{1}{2c}\cdot(s+d)+d_{res},$$

$$r = \frac{1}{2c}\cdot(s-d)-d_{res}.$$

The prediction residual signal 331 operates as a replacement for the synthetic decorrelation signal 341 by its original encoder counterpart. It allows reinstating the original stereo signal by the parametric stereo upmix apparatus 300. The prediction residual signal 331 can either completely replace the decorrelated mono downmix signal 341 for a given time/frequency tile or it can work in a complementary fashion. The latter is beneficial in case the prediction residual signal is only sparsely coded, e.g. only a few of most significant frequency bins are encoded. In this case energy still is missing as compared with the encoder prediction residual signal. This lack of energy is filled by the decorrelated signal 341. A new decorrelated scaling factor β' is then calculated as:

$$\beta' = \sqrt{\beta^2 - \frac{\langle d_{res,cod}, d_{res,cod} \rangle}{\langle s, s \rangle}},$$

where $\langle d_{res,cod}, d_{res,cod} \rangle$ is the signal power of the coded prediction residual signal and $\langle s, s \rangle$ is the power of the mono downmix signal 204.

Figure 1:
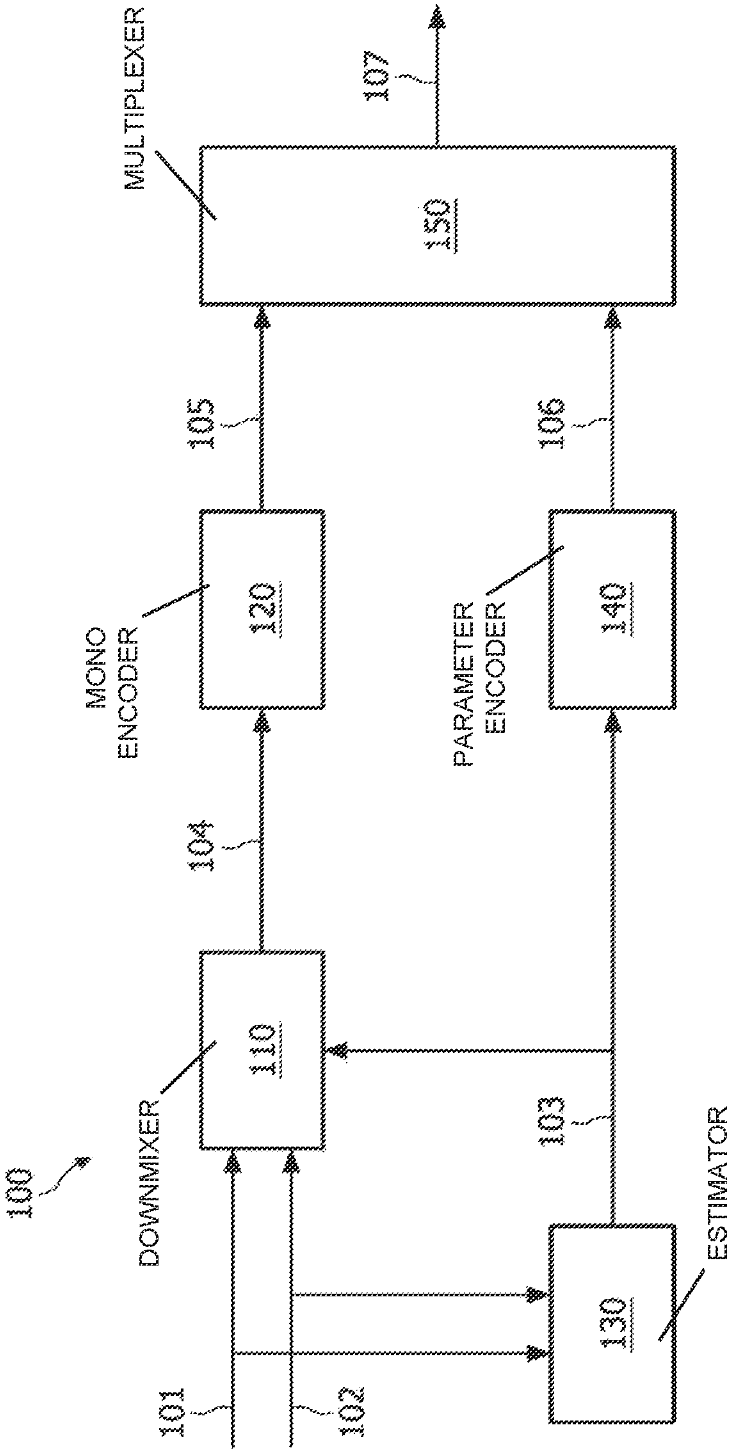
FIG. 1 PRIOR ART
Figure 2:
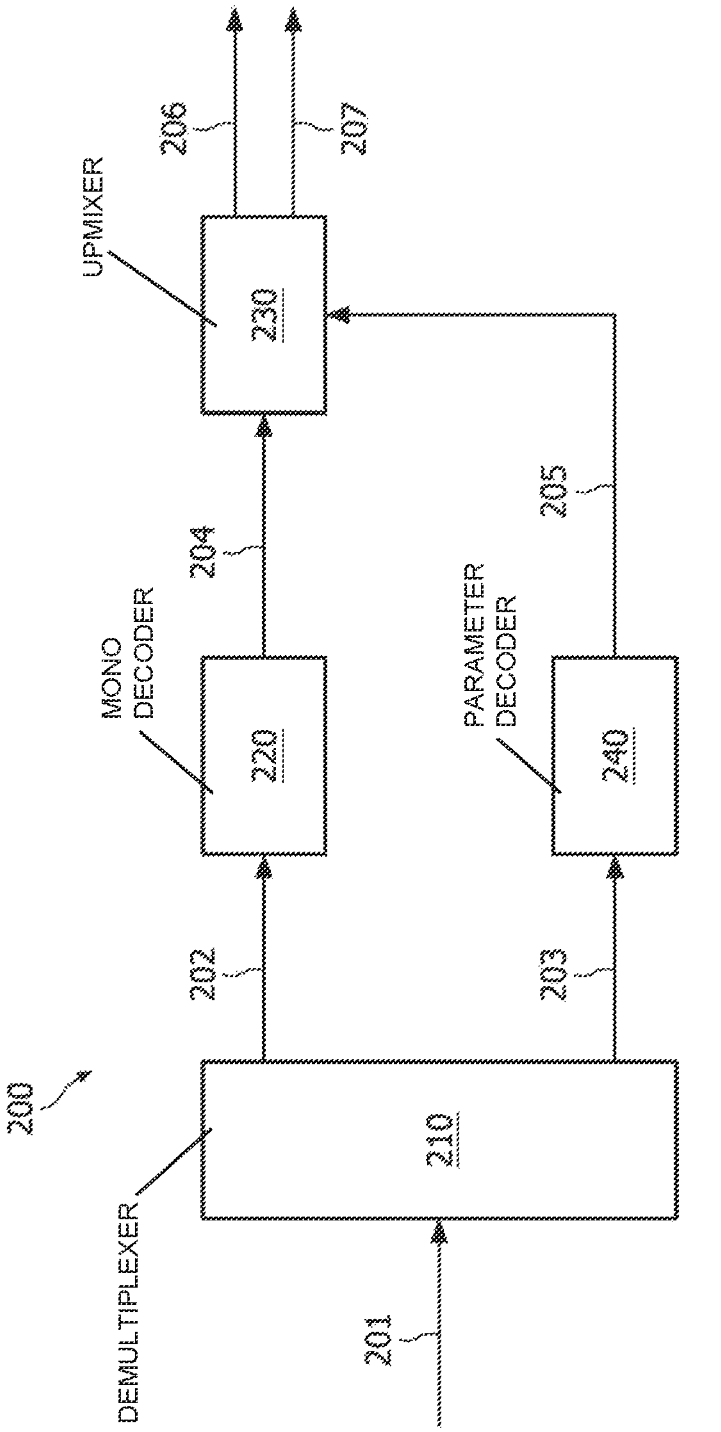
FIG. 2 PRIOR ART

The parametric stereo upmix apparatus 300 can be used in the state of the art architecture of the parametric stereo decoder without any additional adaptations. The parametric stereo upmix apparatus 300 replaces then the upmix unit 230 as depicted in FIG. 2. When the prediction residual signal 331 is used by the parametric stereo upmix 400 a couple of adaptations are required, which are depicted in FIG. 6.

Figure 6:
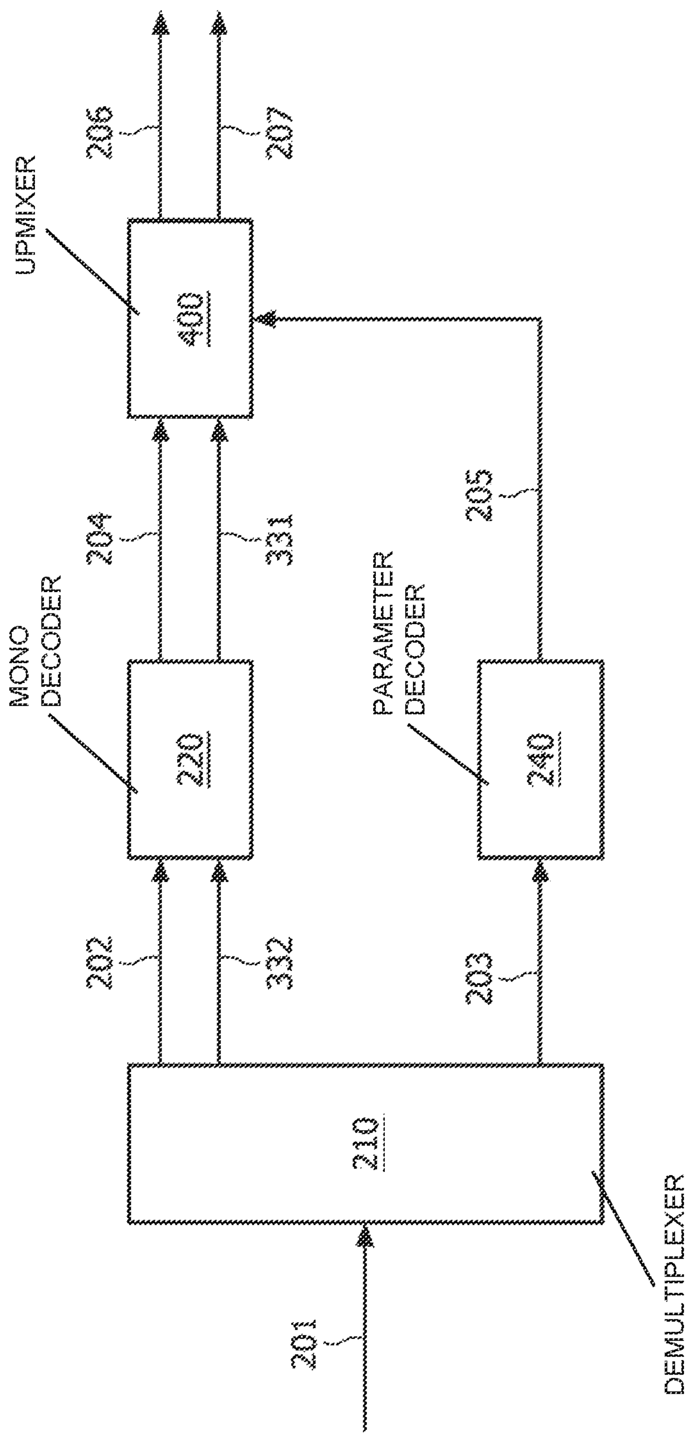
FIG. 6 shows the parametric stereo decoder comprising the parametric stereo upmix apparatus according to the invention.

FIG. 6 shows the parametric stereo decoder comprising the parametric stereo upmix apparatus 400 according to the invention. A parametric stereo decoder comprises a demultiplexing means 210 for splitting the input bitstream into a mono bitstream 202, a prediction residual bitstream 332, and parameter bitstream 203. A mono decoding means 220 decode said mono bitstream 202 into a mono downmix signal 204. The mono decoding means is further configured to decode the prediction residual bitstream 332 into the prediction residual signal 331. A parameter decoding means 240 decode the parameter bitstream 203 into spatial parameters 205. The parametric stereo upmix apparatus 400 generates a left signal 206 and a right signal 207 from the mono downmix signal 204 and the prediction residual signal 331 based on spatial parameters 205. Although the decoding of the mono downmix signal 204 and the prediction residual signal is performed by the decoding means 220, it is possible that said decoding is performed by a separate decoding software and/or hardware for each of the signals to be decoded.

Figure 7:
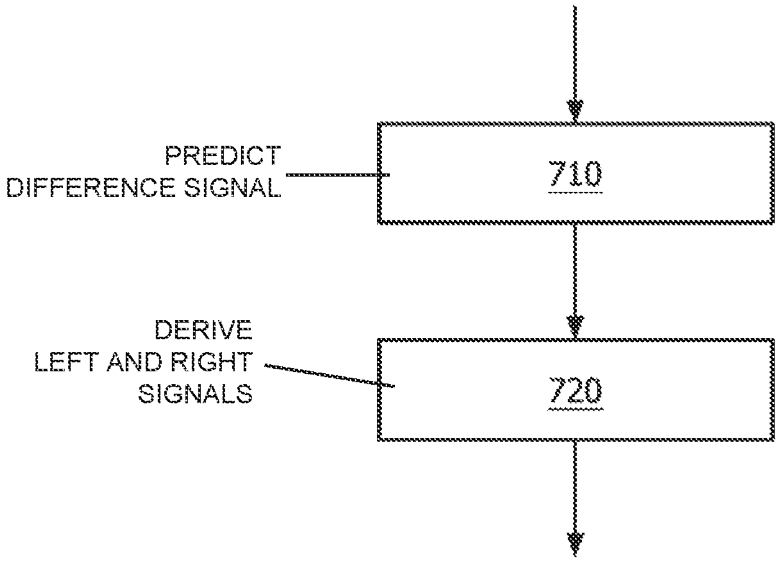
FIG. 7 shows a flow chart for a method for generating the left signal and the right signal from the mono downmix signal based on spatial parameters according to the invention.

FIG. 7 shows a flow chart for a method for generating the left signal 206 and the right signal 207 from the mono downmix signal 204 based on spatial parameters according to the invention. In a first step 710 a difference signal 311 comprising a difference between the left signal 206 and the right signal 207 is predicted based on the mono downmix signal 204 scaled with a prediction coefficient 321, whereby said prediction coefficient is derived from the spatial parameters 205. In a second step 720 the left signal 206 and the right signal 207 are derived based on a sum and a difference of the mono downmix signal 204 and said difference signal 311.

When the prediction residual signal is available in the second step 720 the prediction residual signal next to the mono downmix signal 204 and the difference signal 311 is used to derive the left signal 206 and the right signal 207.

When the parametric stereo upmix 300 is used in the parametric stereo decoder no modifications to the parametric stereo encoder are required. The parametric stereo encoder as known in the prior art can be used.

However, when the parametric stereo upmix 400 is used the parametric stereo encoder must be adapted to provide the prediction residual signal in the bitstream.

Figure 8:
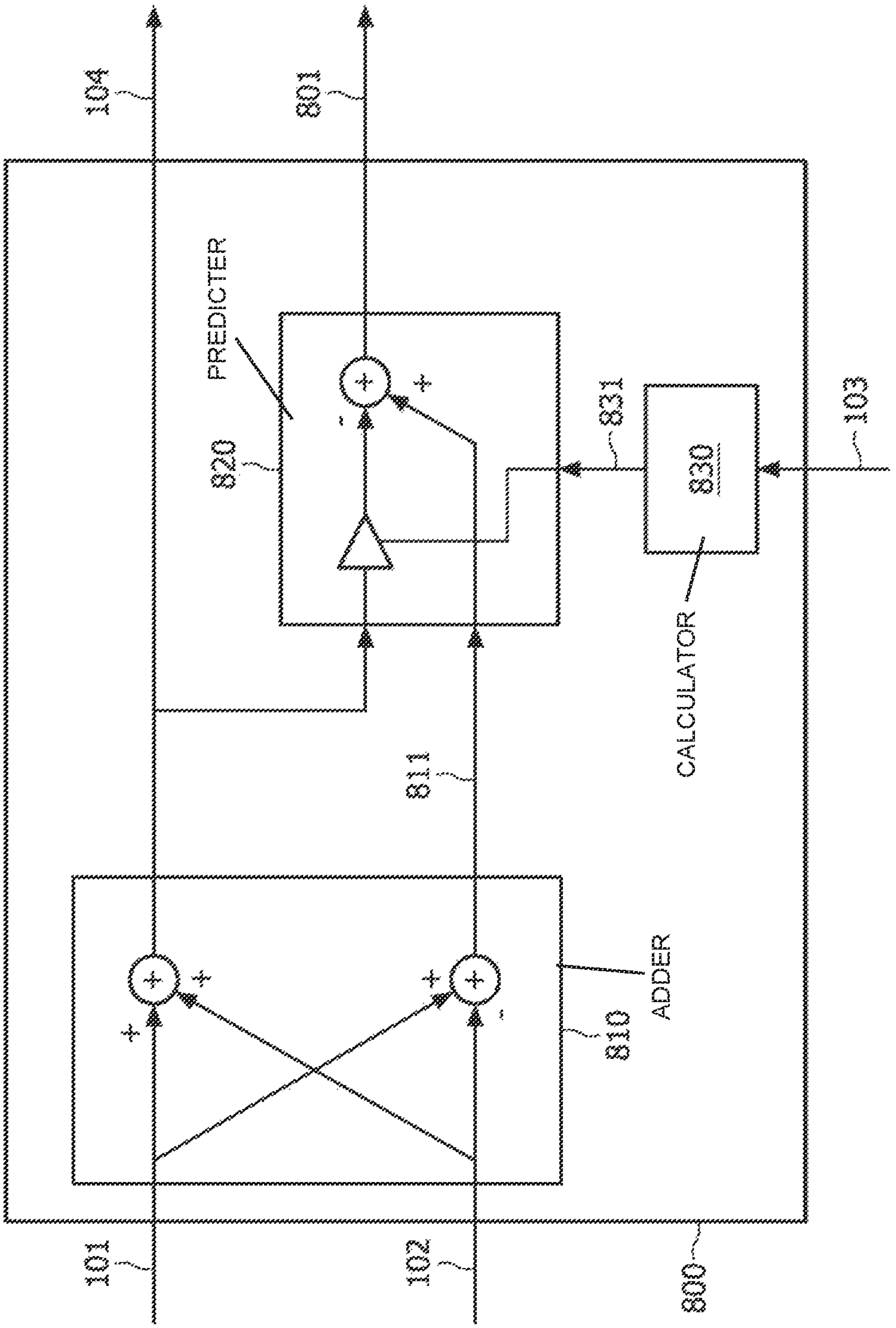
FIG. 8 shows a parametric stereo downmix apparatus according to the invention, said parametric stereo downmix apparatus generating a mono downmix signal from the left signal and the right signal based on spatial parameters.

FIG. 8 shows a parametric stereo downmix apparatus 800 according to the invention, said parametric stereo downmix apparatus generating a mono downmix signal from the left signal and the right signal based on spatial parameters. Said parametric stereo downmix apparatus 800 outputs next to the mono downmix signal 104 an additional signal 801, which is the prediction residual signal. Said parametric stereo downmix apparatus 800 comprises a further arithmetic means 810 for deriving the mono downmix signal 104 and a difference signal 811 comprising a difference between the left signal 101 and the right signal 102. Said parametric stereo downmix apparatus 800 comprises further a further prediction means 820 for deriving a prediction residual signal (for the difference signal) 801 as a difference between the difference signal 811 and the mono downmix signal 104 scaled with a predetermined prediction coefficient 831 derived from the spatial parameters 103. Said predetermined prediction coefficient is determined in a unit 830. The predetermined prediction coefficient is chosen to provide the prediction residual signal 801 that is orthogonal to the mono downmix signal 104. In addition power normalization of the downmix signal can be employed (not shown in FIG. 8).

Although the numbering of the signals corresponding to the mono downmix and the prediction residual have different reference numbers in the parametric stereo upmix apparatus and the parametric stereo downmix apparatus, it should be clear that the mono downmix signals 204 and 104 correspond to each other and the prediction residual signal 331 and 801 as well correspond to each other.

Figure 9:
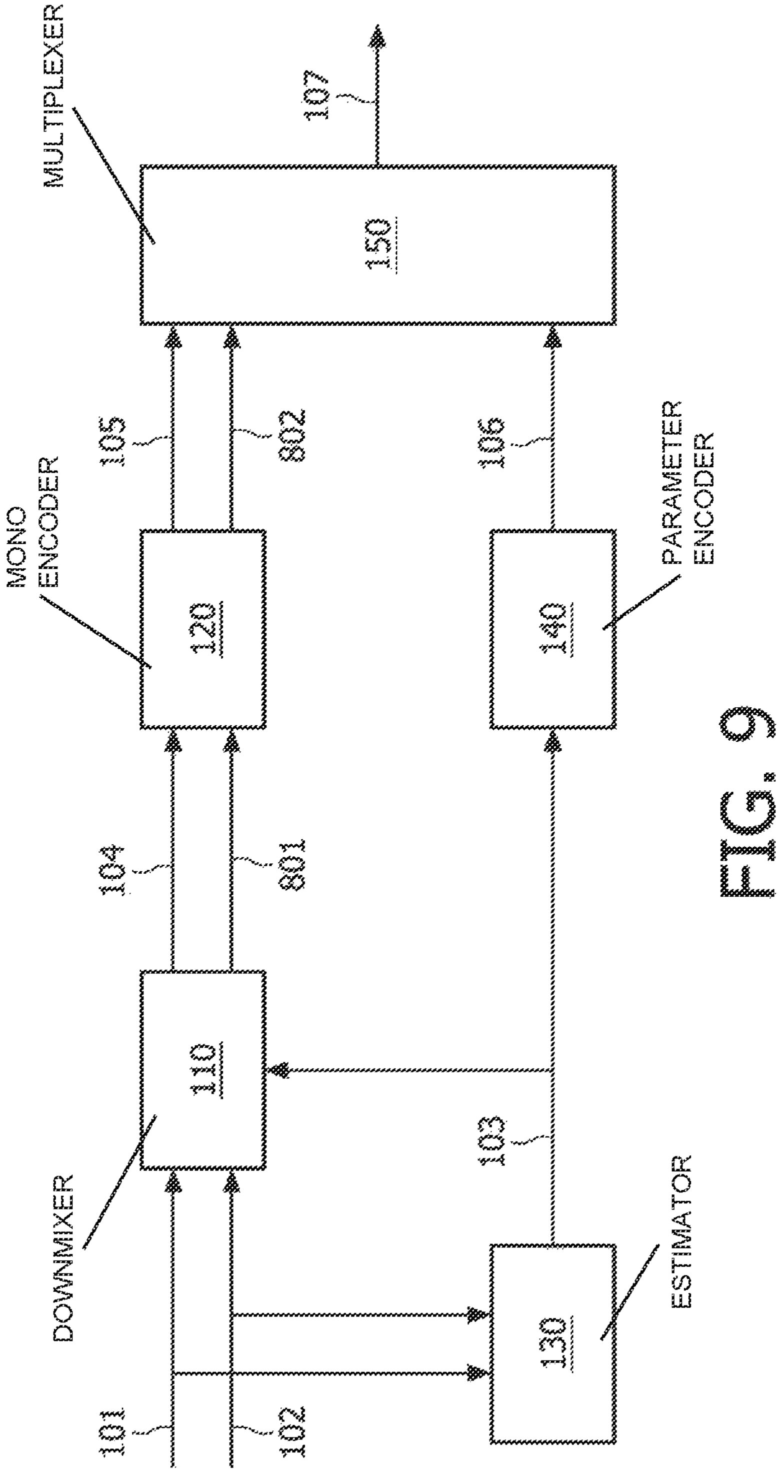
FIG. 9 shows the parametric stereo encoder comprising the parametric stereo downmix apparatus according to the invention.

FIG. 9 shows the parametric stereo encoder comprising the parametric stereo downmix apparatus 800 according to the invention. Said parametric stereo encoder comprises:

- an estimation means 130 for deriving spatial parameters 103 from the left signal 101 and the right signal 102,
- a parametric stereo downmix apparatus 110 according to the invention for generating a mono downmix signal 104 from the left signal 101 and the right signal 102 based on spatial parameters 103,
- a mono encoding means 120 for encoding said mono downmix signal 104 into a mono bitstream 105, said mono encoding means 120 being further arranged to encode the prediction residual signal 801 into a prediction residual bitstream 802,
- a parameter encoding means 140 for encoding spatial parameters 103 into a parameter bitstream 106, and
- a multiplexing means 150 for merging the mono bitstream 105, the parameter bitstream 106 and the prediction residual bitstream 802 into an output bitstream 107.

Although the encoding of the mono downmix signal 104 and the prediction residual signal 801 is performed by the encoding means 120, it is possible that said encoding is performed by a separate decoding software and/or hardware for each of the signals to be encoded.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method, comprising:

splitting an input bitstream into a mono bitstream and a parameter bitstream;

decoding the mono bitstream into a mono downmix signal;

decoding the parameter bitstream into spatial parameters;

scaling the mono downmix signal with a prediction coefficient (α) to produce a scaled mono downmix signal;

predicting a first difference signal, wherein the predicting is based on the scaled mono downmix signal;

adding a scaled decorrelated mono downmix signal to the first difference signal to form a second difference signal, wherein the scaled decorrelated mono downmix signal is formed by scaling a decorrelated mono downmix signal by a scaling factor (β);

forming the left signal based on a sum of the mono downmix signal and the second difference signal; and forming the right signal based on a difference between the mono downmix signal and the second difference signal wherein the scaling factor (β) is:

$$\beta = \sqrt{\frac{iid + 1 - 2\cdot\cos(ipd)\cdot icc\cdot\sqrt{iid}}{iid + 1 + 2\cdot\cos(ipd)\cdot icc\cdot\sqrt{iid}} - |\alpha|^2}$$

wherein iid, ipd, and icc are the spatial parameters, wherein iid is an interchannel intensity difference, wherein ipd is an interchannel phase difference, and wherein icc is an interchannel coherence.

2. The method of claim 1, wherein the prediction coefficient (α) is:

$$\alpha = \frac{iid - 1 - j\cdot 2\cdot\sin(ipd)\cdot icc\cdot\sqrt{iid}}{iid + 1 + 2\cdot\cos(ipd)\cdot icc\cdot\sqrt{iid}}.$$

3. The method of claim 1 wherein the scaling factor (β) is derived from spatial parameters.

4. The method of claim 1, wherein the prediction residual signal has substantially zero correlation with the mono downmix signal.

5. The method of claim 1 wherein the scaling factor (β) compensates for a prediction energy loss.

6. The method of claim 1, wherein the prediction coefficient (α) is based on waveform matching the downmix signal onto the first difference signal.

7. A computer program stored on a non-transitory medium, wherein the computer program when executed on a processor performs the method as claimed in claim 1.

8. A method, comprising:

splitting an input bitstream into a mono bitstream and a parameter bitstream;

extracting a prediction residual bitstream from the input bitstream;

decoding the mono bitstream into a mono downmix signal;

decoding a prediction residual signal from the prediction residual bitstream;

decoding the parameter bitstream into spatial parameters;

scaling the mono downmix signal with a prediction coefficient (α) to produce a scaled mono downmix signal;

predicting a first difference signal, wherein the predicting is based on the scaled mono downmix signal;

adding a scaled decorrelated mono downmix signal to the first difference signal to form a second difference signal, wherein the scaled decorrelated mono downmix signal is formed by scaling a decorrelated mono downmix signal by a scaling factor (β);

forming a first portion of the left signal based on a sum of the mono downmix signal, the first difference signal, and the prediction residual signal;

forming a second portion of the left signal based on a sum of the mono downmix signal and the second difference signal;

forming a first portion of the right signal based on a difference between the mono downmix signal, and a sum of the first difference signal and the prediction residual signal; and forming a second portion of the right signal based on a difference between the mono downmix signal and the second difference signal wherein the scaling factor (β) is:

$$\beta = \sqrt{\frac{iid + 1 - 2\cdot\cos(ipd)\cdot icc\cdot\sqrt{iid}}{iid + 1 + 2\cdot\cos(ipd)\cdot icc\cdot\sqrt{iid}} - |\alpha|^2}$$

wherein iid, ipd, and icc are the spatial parameters, wherein iid is an interchannel intensity difference, wherein ipd is an interchannel phase difference, and wherein icc is an interchannel coherence.

9. The method of claim 8, wherein the first portion is a first frequency subband, wherein the second portion is a second frequency subband, wherein the first frequency subband is different from the second frequency subband.

10. The method of claim 8, wherein the first portion comprises a first frequency subband, wherein the second portion comprises a second frequency subband, wherein the first frequency subband does not overlap the second frequency subband.

11. The method of claim 8, wherein the prediction coefficient (α) is:

$$\alpha = \frac{iid - 1 - j\cdot 2\cdot\sin(ipd)\cdot icc\cdot\sqrt{iid}}{iid + 1 + 2\cdot\cos(ipd)\cdot icc\cdot\sqrt{iid}}.$$

12. The method of claim 8 wherein the scaling factor (β) is derived from spatial parameters.

13. The method of claim 8, wherein the prediction residual signal has substantially zero correlation with the mono downmix signal.

14. The method of claim 8 wherein the scaling factor (β) compensates for a prediction energy loss.

15. The method of claim 8, wherein the prediction coefficient (α) is based on waveform matching the downmix signal onto the first difference signal.

16. A computer program stored on a non-transitory medium, wherein the computer program when executed on a processor performs the method as claimed in claim 8.

17. A method, comprising:

splitting an input bitstream into a mono bitstream and a parameter bitstream, wherein the input bitstream comprises a plurality of subbands;

extracting a prediction residual bitstream from the input bitstream, wherein the prediction residual bitstream comprises a third portion of plurality of subbands;

decoding the mono bitstream into a mono downmix signal, wherein the mono downmix signal comprises mono downmix subband signals, wherein the mono downmix subband signal comprises a fourth portion of the plurality of subbands;

decoding a prediction residual signal, wherein the prediction residual signal comprises prediction residual subband signals, wherein the prediction residual subband signals comprise a fifth portion of the third portion of the plurality of subbands;

decoding the parameter bitstream into spatial parameters for at least one subband of the plurality of subbands;

scaling the mono downmix subband signal with a prediction coefficient (α) to produce a scaled mono downmix subband signal for at least one subband of the plurality of subbands;

predicting a first difference subband signal for at least one subband of the plurality of subbands, wherein the predicting is based on the scaled mono downmix subband signal;

adding a scaled decorrelated mono downmix subband signal to the first difference subband signal for at least one subband of the plurality of subbands to form a second difference subband signal, wherein the scaled decorrelated mono downmix subband signal is formed by scaling a decorrelated mono downmix subband signal by a scaling factor (β);

forming a first portion of the left signal, wherein the first portion of the left signal comprises one or more subbands, wherein each subband is based on a sum of the mono downmix subband signal, the first difference subband signal, and the prediction residual subband signal;

forming a second portion of the left signal, wherein the second portion of the left signal comprises one or more subbands, wherein each subband is based on a sum of the mono downmix subband signal and the second difference subband signal;

forming a first portion of the right signal, wherein the first portion of the right signal comprises one or more subbands, wherein each subband is based on a difference between the mono downmix subband signal, and a sum of the first difference subband signal and the prediction residual subband signal; and forming a second portion of the right signal, wherein the second portion of the right signal comprises one or more subbands, wherein each subband is based on a difference between the mono downmix subband signal and the second difference subband signal wherein the scaling factor (β) is:

$$\beta = \sqrt{\frac{iid + 1 - 2 \cdot \cos(ipd) \cdot icc \cdot \sqrt{iid}}{iid + 1 + 2 \cdot \cos(ipd) \cdot icc \cdot \sqrt{iid}} - |\alpha|^2}$$

wherein iid, ipd, and icc are the spatial parameters, wherein iid is an interchannel intensity difference, wherein ipd is an interchannel phase difference, and wherein icc is an interchannel coherence.

18. The method of claim 17, wherein the prediction coefficient (α) is:

$$\alpha = \frac{iid - 1 - j \cdot 2 \cdot \sin(ipd) \cdot icc \cdot \sqrt{iid}}{iid + 1 + 2 \cdot \cos(ipd) \cdot icc \cdot \sqrt{iid}}.$$

19. The method of claim 17 wherein the scaling factor (β) is derived from spatial parameters.

20. The method of claim 17, wherein the prediction residual signal has substantially zero correlation with the mono downmix signal.

21. The method of claim 17 wherein the scaling factor (β) compensates for a prediction energy loss.

22. The method of claim 17, wherein the prediction coefficient (α) is based on waveform matching the downmix signal onto the first difference signal.

23. A computer program stored on a non-transitory medium, wherein the computer program when executed on a processor performs the method as claimed in claim 17.

* * * * *